(12) United States Patent
Park et al.

(10) Patent No.: US 10,393,490 B2
(45) Date of Patent: Aug. 27, 2019

(54) LENGTH MEASURING DEVICE AND LENGTH MEASURING SYSTEM

(71) Applicant: BAGEL LABS CO., LTD., Seongnam-si, Gyeonggi-do (KR)

(72) Inventors: Soo-Hong Park, Seoul (KR); Eun Young Choi, Seoul (KR)

(73) Assignee: BAGEL LABS CO., LTD., Seongnam-si, Gyeonggi-do (KR)

(*) Notice: Subject to any disclaimer, the term of this patent is extended or adjusted under 35 U.S.C. 154(b) by 150 days.

(21) Appl. No.: 15/311,516

(22) PCT Filed: Mar. 16, 2016

(86) PCT No.: PCT/KR2016/002644
§ 371 (c)(1),
(2) Date: Nov. 15, 2016

(87) PCT Pub. No.: WO2016/148504
PCT Pub. Date: Sep. 22, 2016

(65) Prior Publication Data
US 2017/0082413 A1     Mar. 23, 2017

(30) Foreign Application Priority Data

Mar. 17, 2015 (KR) ........................ 10-2015-0036499
Mar. 2, 2016 (KR) ........................ 10-2016-0025248
Mar. 11, 2016 (KR) ........................ 10-2016-0029620

(51) Int. Cl.
*G01B 3/10* (2006.01)
*G01B 3/12* (2006.01)

(52) U.S. Cl.
CPC ............. *G01B 3/1084* (2013.01); *G01B 3/10* (2013.01); *G01B 3/1041* (2013.01); *G01B 3/12* (2013.01);
(Continued)

(58) Field of Classification Search
CPC .......... G01B 2003/1069; G01B 3/1041; G01B 3/1056; G01B 3/1061; G01B 3/1084; G01B 3/12; G01B 2003/1043
(Continued)

(56) References Cited

U.S. PATENT DOCUMENTS 4,551,847 A * 11/1985 Caldwell .............. G01B 3/1061
33/755
4,649,649 A * 3/1987 Fain ..................... G01B 3/1005
33/761

(Continued)

FOREIGN PATENT DOCUMENTS

CN          102188270 A      9/2011
JP          64-500373 A      2/1989
(Continued)

*Primary Examiner* — Yaritza Guadalupe-McCall
(74) *Attorney, Agent, or Firm* — Rabin & Berdo, P.C.

(57) ABSTRACT

A length measuring device and a length measuring system are provided, in which the length measuring device includes a casing, a first rotating portion accommodated in the casing, and rotated with a portion of a circumference thereof being exposed out of the casing and in contact with an object to be measured, a first sensing portion which senses an amount of rotation of the first rotating portion, and a controller which converts the amount of rotation of the first rotating portion into length measurement. Additionally, the length measuring device may further include a second rotating portion coiled with a strip by a plurality of times, and rotated according to the strip being withdrawn or retracted through an outlet formed in the casing, and a second sensing portion which senses an amount of rotation of the second rotating portion, in which the controller may convert the amount of rotation of the second rotating portion into length measurement.

15 Claims, 11 Drawing Sheets

(52) U.S. Cl.
CPC .............. *G01B 2003/1023* (2013.01); *G01B 2003/1069* (2013.01); *G01B 2003/1087* (2013.01); *G01B 2003/1092* (2013.01); *G01B 2003/1094* (2013.01)

(58) Field of Classification Search
USPC .................................................. 33/755–771
See application file for complete search history.

(56) References Cited

U.S. PATENT DOCUMENTS

| | | | |
|---|---|---|---|
| 5,035,064 A | 7/1991 | Care | |
| 5,060,394 A * | 10/1991 | Lincoln | G01B 3/1061 33/761 |
| 6,820,343 B2 * | 11/2004 | Waibel | G01C 15/02 33/293 |
| 6,889,444 B2 * | 5/2005 | Trout | G01B 3/12 33/755 |
| 7,040,035 B1 * | 5/2006 | Scarborough | G01B 3/1084 33/668 |
| 7,272,893 B2 * | 9/2007 | Williams | G01B 3/12 33/772 |
| 7,370,433 B1 | 5/2008 | Caraway | |
| 2002/0059735 A1 | 5/2002 | Ponce | |
| 2007/0124952 A1 * | 6/2007 | Williams | G01B 3/12 33/773 |
| 2008/0082119 A1 * | 4/2008 | Vitullo | G01B 3/12 606/192 |
| 2017/0082413 A1 * | 3/2017 | Park | G01B 3/1041 |
| 2018/0120080 A1 * | 5/2018 | Park | G01B 7/026 |

FOREIGN PATENT DOCUMENTS

| | | |
|---|---|---|
| JP | 3-189501 A | 8/1991 |
| JP | 5-503783 A | 6/1993 |
| JP | 6-70666 A | 3/1994 |
| JP | 6-84308 U | 12/1994 |
| JP | 8-12041 B2 | 2/1996 |
| JP | 2002-031530 A | 1/2002 |
| JP | 2004-233106 A | 8/2004 |
| KR | 20-1994-0006848 Y1 | 10/1994 |
| KR | 20-0111136 | 3/1995 |
| KR | 20-1999-0037565 U | 10/1999 |
| KR | 10-2004-0096123 A | 11/2004 |
| KR | 20-2009-0007958 U | 8/2009 |
| KR | 10-1486652 B1 | 1/2015 |
| TW | M499548 U | 4/2015 |
| TW | M506277 U | 8/2015 |
| TW | M506279 U | 8/2015 |
| WO | WO 2013-122537 A1 | 8/2013 |
| WO | WO 2015-162946 A1 | 10/2015 |

* cited by examiner

LENGTH MEASURING DEVICE AND LENGTH MEASURING SYSTEM

FIELD OF THE INVENTION

The present disclosure relates to a measuring apparatus for measuring sizes, lengths or widths of an object to be measured, and more particularly, to a length measuring device capable of measuring both straight lengths and curved lengths of an object to be measured, and a length measuring system using the same.

DESCRIPTION OF THE RELATED ART

Generally, a measuring tape has a tape configuration and length indicia formed on a surface thereof so that it is used for measuring widths or breadths of a certain space, or for measuring sizes, lengths or widths of an object to be measured.

While there are several forms of measuring tapes available, a typical example of a measuring tape includes a ruler wound in a coil shape and having marks formed on a surface, an inner space for accommodating the ruler, and a casing having an entrance through which the ruler accommodated within the inner space is withdrawn and retracted such that an operator pulls out the ruler with marks indicated thereon long enough to read the marks on an end of the ruler and approximate body portion that reaches an end of the object to be measured, and thus measure the length of the object to be measured.

However, while the conventional measuring tape is capable of measuring straight lengths of an object to be measured, it has a difficulty of measuring circumference of a cylinder or curved lengths as it is not in a form that is freely bendable.

Another conventional measuring tape is freely bendable and thus is capable of measuring both the straight lengths and the curved lengths. However, this type of measuring tape is not able to measure a long length accurately because the tape tends to bend when measuring long lengths.

Further, the conventional measuring tape has a drawback in that the measurable length is limited to the length of the tape.

Moreover, because an operator of the conventional measuring tape measures lengths by manually reading the measurements himself or herself, errors may be generated depending on operators, and the operator has inconvenience of having to measure the length by length and then write the measured numbers with handwriting or separate typing procedure.

DETAILED DESCRIPTION

Technical Problem

Accordingly a technical objective of the present disclosure is to provide a length measuring device capable of measuring both straight lengths and curved lengths of an object to be measured, and a length measuring system using the same.

Solution to the Problem

According to an exemplary embodiment of the present disclosure, a length measuring device includes a casing, a first rotating portion accommodated in the casing, the first rotating portion being rotated with a portion of a circumference thereof being exposed out of the casing and in contact with an object to be measured, a first sensing portion configured to sense an amount of rotation of the first rotating portion, and a controller configured to convert the amount of rotation of the first rotating portion into length measurement.

The length measuring device may additionally include a second rotating portion being coiled with a strip by a plurality of times, and being rotated according to the strip being withdrawn or retracted through an outlet formed in the casing, and a second sensing portion configured to sense an amount of rotation of the second rotating portion.

The controller may convert the amount of rotation of the first rotating portion into length measurement, or convert the amount of rotation of the second rotating portion into length measurement.

The controller may convert the amount of rotation of the second rotating portion into length measurement, by applying a conversion ratio for converting a unit amount of rotation of the second rotating portion into a length, which is decreased in a stepwise pattern at predetermined intervals.

The length measuring device may additionally include a second rotating portion onto which an end of the strip is attached and coiled by a plurality of times, the second rotating portion configured to automatically coil back the strip until other end of the strip is locked in an outlet formed in the casing, a third rotating portion configured to be rotated in accordance with the strip being withdrawn or retracted through the outlet formed in the casing, and a second sensing portion configured to sense an amount of rotation of the third rotating portion.

The controller may convert the amount of rotation of the third rotating portion into length measurement.

The third rotating portion is coiled with the strip one time, and the third rotating portion is rotated upon the strip being released from the second rotating portion.

The length measuring device may additionally include a second rotating portion coiled with the strip along a rotational axis sequentially by a plurality of times without overlapping, the second rotating portion being rotated according to the strip being withdrawn or retracted, and a second sensing portion configured to sense an amount of rotation of the second rotating portion, in which the controller may convert the amount of rotation of the second rotating portion into length measurement.

The first rotating portion may include a rotational axis passed through the casing, and a driving wheel coupled with the rotational axis and disposed within the casing, to be rotated while being in contact with a surface of the object to be measured along the surface of the object to be measured.

The length measuring device may additionally include a second rotating portion being coupled with the first rotating portion and being individually rotatable, in which a strip coiled around the second rotating portion may be withdrawn out of the casing as much as a length of the object to be measured, and in which the rotational axis includes a first coupling portion formed in a polygonal column shape to be coupled with the driving wheel, and a second coupling portion in a cylindrical column shape extended from an end of the first coupling portion along a direction of axis to be coupled with the second rotating portion.

The second rotating portion may include a drum coupled with the second coupling portion and individually driven from the rotational axis, in which the strip may be coiled around the drum, and withdrawn out of the casing during measurement, while rotating the drum.

The second rotating portion may additionally include a drum support bearing disposed between the drum and the second coupling portion to support the drum.

The length measuring device may additionally include a second sensing portion configured to sense an amount of rotation of the drum, in which the first sensing portion may sense the amount of rotation of the driving wheel, and the controller may convert the amount of rotation of the driving wheel or the amount of rotation of the drum into length measurement.

The length measuring device may additionally include a third rotating portion coiled one time with the strip before the strip is withdrawn out of the casing, wherein the strip is coiled onto the drum by a plurality of times, and a second sensing portion configured to sense an amount of rotation of the third rotating portion, in which the first sensing portion may sense the amount of rotation of the driving wheel, and the controller may convert the amount of rotation of the driving wheel or the amount of rotation of the third rotating portion into length measurement.

In another exemplary embodiment of the present disclosure, a length measuring device may include a casing comprising an outlet through which a strip is withdrawn or retracted, a switch provided on the casing, a first rotating portion accommodated in the casing, the first rotating portion being rotated with a portion of a circumference thereof being exposed out of the casing and in contact with an object to be measured, the first rotating portion having a first rotating gear formed at a center, a second rotating portion coiled with the strip by a plurality of times, the second rotating portion being rotated according to withdrawal or retraction of the strip and having a second rotating gear at a center, a third rotating gear connected to the switch such that the third rotating gear is in mesh with the first rotating gear or the second rotating gear according to switching operation of the switch, a sensing portion configured to sense an amount of rotation of the third rotating gear, a controller configured to convert the amount of rotation of the third rotating gear into length measurement, and a display configured to display the length measurement.

The sensing portion may be formed at a rotational axis of the third rotating gear.

When the switch is in a first position, the third rotating gear may be rotated in mesh with the first rotating gear to cause the sensing portion to sense the amount of rotation of the first rotating portion, while the third rotating gear may be rotated in mesh with the second rotating gear to cause the sensing portion to sense the amount of rotation of the second rotating portion, when the switch is in a second position.

The length measuring device may additionally include a fourth rotating gear meshed with the first rotating gear. When the third rotating gear is meshed with the second rotating gear, the fourth rotating gear may be meshed with the third rotating gear together.

The length measuring device may additionally include a laser guide portion configured to mark a guide line on the object to be measured.

The length measuring device may additionally include a microphone portion configured to receive a voice signal from an operator, and a storage configured to map the voice signal inputted from the operator and the length measurement, and store the same.

The length measuring device may additionally include a communication portion configured to transmit the length measurement externally.

The length measuring device may additionally include a contactless measuring portion configured to measure a distance to an object by generating a predetermined signal and receiving the signal reflected back from the object.

According to yet another exemplary embodiment of the present disclosure, a length measuring system may include a length measuring device for receiving a voice signal corresponding to a length measurement from an operator, and tagging the voice signal to the length measurement and transmitting the same, and a user terminal for receiving the length measurement with the voice signal tagged thereto and storing the same.

The length measuring device may be provided with a gyro sensor portion to acquire angle information at the time of measuring, and transmit the acquired angle information along with the length measurement to the user terminal, and the user terminal may automatically perceive an object to be measured using the length measurement and the angle information at the time of measuring.

Effects

The length measuring device and the length measuring system using the same according to exemplary embodiments can provide advantages that it can accurately measure not only straight lengths, but also curved lengths of a plane or distance of a three dimensional structure, by diversifying the use of measuring tape.

Further, the operator is not required to check the length based on the marks on the measuring tape, because the display automatically displays the length measurements. Accordingly, there is an advantage that accurate length measurements and stable measurements can be acquired even under different measuring conditions.

Moreover, since the communication portion is embedded to allow direct transmission of the length measurements to the user terminal with a click on the button by the operator, the operator is relieved from inconvenience of having to write down the length measurements by handwriting or separate typing procedure.

Additionally, a measure application installed on the user terminal can be automatically executed when the length measurement is transmitted, to thus provide the operator with a variety of services.

Further, the length measuring device is capable of accurately converting the withdrawn strip into length measurements.

Further, the first rotating portion and the second rotating portion can be individually driven to thus allow complex measurements, and even when either of the first rotating portion or the second rotating portion has abnormality, it is still possible to measure the length of the object to be measured using the other rotating portion.

Further, a plurality of passing holes are formed in the casing to thus expose the driving wheel of the first rotating portion through a plurality of locations. Accordingly, it is easy to grip during measuring, and measure the length of the object to be measured with a variety of methods.

Further, the surface of the driving wheel is coated to thus enhance the grip force with the object to be measured. Accordingly, more accurate measurement can be performed.

BRIEF DESCRIPTION OF THE DRAWINGS

FIG. 11 illustrates a configuration of a length measuring system according to an exemplary embodiment of the present disclosure.

FIG. 12 is a schematic perspective view of a length measuring device according to another exemplary embodiment of the present disclosure.

MODE FOR EMBODYING THE INVENTION

Hereinbelow, the present disclosure will be described in detail with reference to the accompanied drawings to enable those skilled in the art to easily work the present disclosure.

Figure 1:
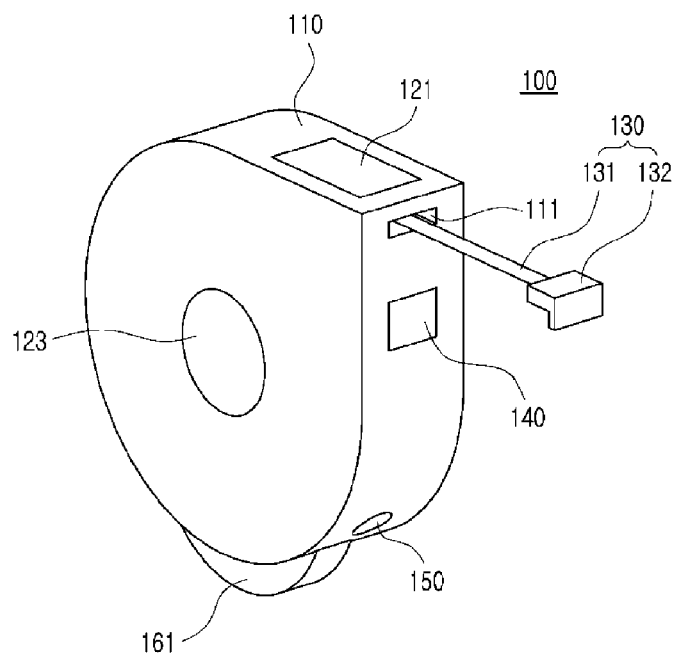
FIG. 1 is a schematic perspective view of a length measuring device according to an exemplary embodiment of the present disclosure.

FIG. 1 is a schematic perspective view of a length measuring device according to an exemplary embodiment of the present disclosure.

Referring to FIG. 1, a length measuring device 100 according to an exemplary embodiment may include a strip portion 130 composed of a strip 131 and a hook 132. The length measuring device 100 may convert the extent by which the strip 131 is withdrawn from a coiled state in the casing 110 through an outlet into a length measurement. For example, when an operator pulls the hook 132 engaged with one end of the strip 131 to a direction opposite the outlet 111, the strip 131 is withdrawn through the outlet 111, thus causing a rotator (not illustrated) provided inside to be rotated. Accordingly, the length measurement increases according to an amount of rotation of the rotator. In contrast, when the operator releases the hook 132, the strip 131 is automatically coiled back and retracted through the outlet 111 into the casing 110. Accordingly, the length measurement is decreased. In order to allow the automatic retraction of the strip, the rotator may be implemented to have a recovery force in a direction opposite the direction in which the strip 131 is withdrawn. Also in order to prevent the strip 131 from being entirely inserted into the casing 110, the hook 132 may be configured in a ring shape such as "⌐" or "⌐" of which a portion is perpendicularly bent such that the hook 132 can be locked in the outlet 111.

The coiled structure of the strip 131 around the rotator inside the casing 110, and a method for converting the extent by which the strip 131 is withdrawn through the outlet 111 into a length measurement, will be described in detail below.

The length measuring device 100 may obtain a length measurement based on an amount of rotation of a first rotating portion 161 that is partially exposed out of the casing 110. For example, when the first rotating portion 161 is brought into contact with an object to be measured and the length measuring device 100 is pushed or pulled in one direction, the first rotating portion 161 is rotated and the length measurement is increased.

Meanwhile, although FIG. 1 illustrates that the first rotating portion 161 is partially exposed, depending on exemplary embodiments, it may be implemented such that the first rotating portion 161 is entirely exposed out of the casing 110.

In an exemplary embodiment, the first rotating portion 161 may be integrally formed, or engaged with the rotator on which the strip is coiled, or in another exemplary embodiment, the first rotating portion 161 may be separated from the rotator and operated individually. The structure of the first rotating portion 161 and the rotator, and the relationships with which these are operated will be described in detail below.

The length measuring device 100 may include a laser guide 150 that can emit a light such as laser and mark a guide line on an object to be measured. While FIG. 1 illustrates only one laser guide 150, in another embodiment, there may be an additional one formed on an opposite side of the casing 110 with reference to the first rotating portion 161.

The length measuring device 100 may include a function of obtaining a length measurement based on a time during which laser, infrared rays, ultrasonic waves, and so on are generated at a contactless measuring portion 140 and reflected back.

The length measuring device 100 may include a display 121 to visually express the length measurement.

The length measuring device 100 may additionally include a button portion 123 to receive an input of commands associated with the operation of the length measuring device 100 from the operator. The button portion 123 may be implemented as a mechanical structure, or in a form such as a touch pad and so on that senses a contact of a user's finger and so on at a corresponding location.

Figure 2:
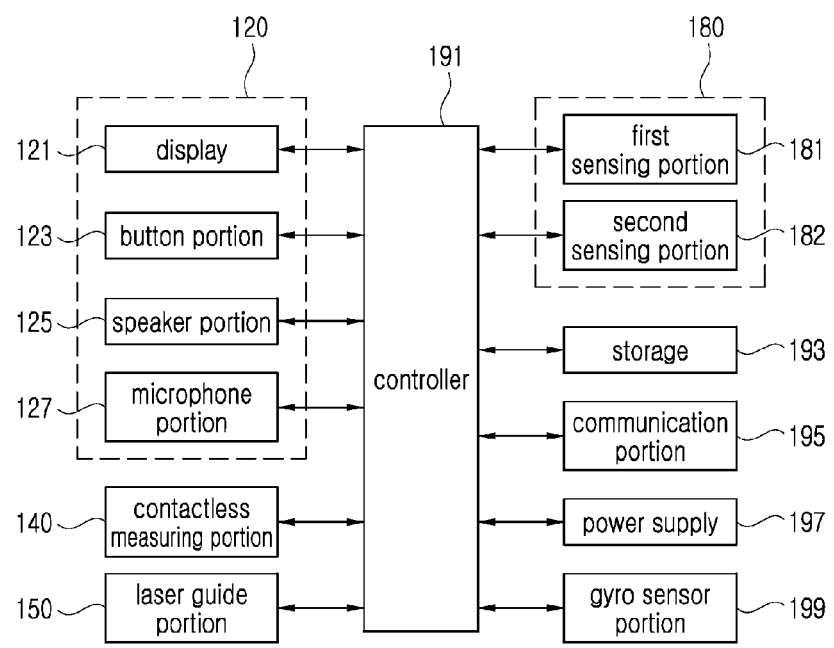
FIG. 2 illustrates electrical elements of a length measuring device according to an exemplary embodiment of the present disclosure.
Figure 3:
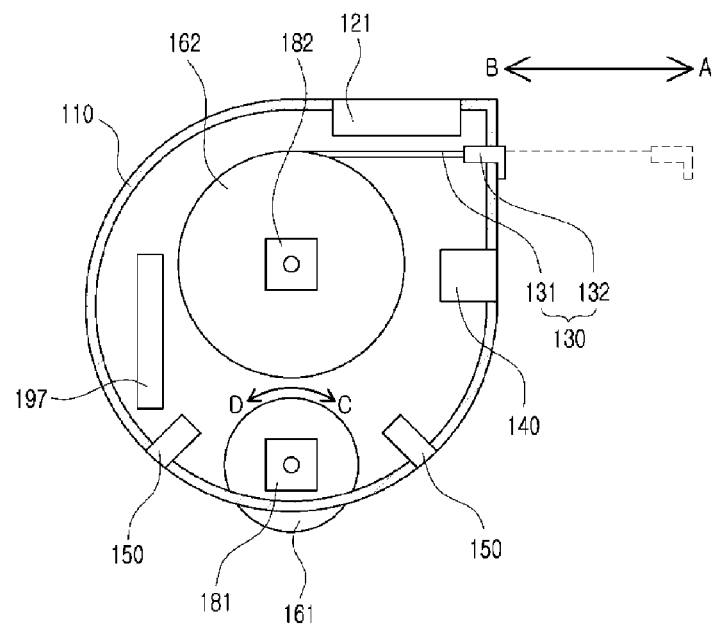
FIG. 3 illustrates relationships with which the main elements of a length measuring device are disposed inside a casing, according to a first exemplary embodiment of the present disclosure.

FIG. 2 illustrates electrical elements of a length measuring device according to an exemplary embodiment of the present disclosure, and FIG. 3 illustrates relationships with which the main elements of a length measuring device are disposed inside a casing, according to a first exemplary embodiment of the present disclosure.

Referring to FIGS. 1 to 3, the length measuring device 100 may include a casing 110, an input/output portion 120, a strip portion 130, a contactless measuring portion 140, a laser guide portion 150, a first rotating portion 161, a second rotating portion 162, a sensing portion 180, a controller 191, a storage 193, a communication portion 196, a power supply 197, and a gyro sensor portion 199.

The casing 110 may function to house and protect therein respective elements of the length measuring device 100, and may include an outlet 111 through which the strip 131 is withdrawn externally. The design of the casing 110 may vary depending on embodiments.

The input/output portion 120 may function to receive commands associated with the operation of the length measuring device 100 from the operator, or output information associated with the operation of the length measuring device 100 to the operator.

Specifically, the input/output portion 120 may include all or part of the display 121, the button portion 123, a speaker portion 125, and a microphone portion 127.

The display 121 may function to visually display the information associated with the operation of the length measuring device 100, and to that purpose, may be composed of a display module such as LED, LCD, OLED, and so on. Specifically, the display 121 may display the length measurement obtained at the length measuring device 100, and display the information about current operation mode.

The button portion 123 may receive commands for setting the operation mode of the length measuring device 100 from the operator. For example, it may be implemented such that one pressing on the button portion 123 by the operator may select a length measure mode that is based on the strip 131 (hereinbelow, 'strip measure mode'), two pressing may select a length measure mode that is based on the amount of rotation of the first rotating portion 161 (hereinbelow, 'wheel measure mode'), three pressing may select the length measure mode that is based on the contactless measuring portion 140 (hereinbelow, 'contactless measure mode'), and so on. Of course, depending on embodiments, the button portion 123 may be implemented to receive a variety of commands associated with the operation of the length measuring device 100 from the operator in manners other than those exemplified herein.

Meanwhile, in another implementation, the commands from the operator may be inputted through the first rotating portion 161. For example, it may be implemented such that pressing on the button portion 123 may display an initial menu on the display 121 such that the operator is allowed to select a sub menu by rotating the first rotating portion 161. For example, one pressing on the button portion 123 may cause one of the three length measure modes to appear such that the controller 191 may change the length measure mode displayed on the display 121 according to the operator rotating the first rotating portion 161. After that, while a specific length measure mode is being displayed on the display 121, when the operator presses the button portion 123 again, the length measuring device 100 may be operated in the selected mode. Of course, implementations other than those described herein are also possible. For example, the operator may selectively operate the button portion 123 and the first rotating portion 161 and the corresponding command of the operator may be inputted.

Although FIG. 1 exemplifies that the buttons of the button portion 123 are disposed at a center portion of the casing 110, the buttons may also be disposed at other locations. Additionally, types other than the button type, such as a touch module that can sense a touch by the operator's hand, or a mechanical switch, and so on may be replace the button type. Further, the button portion 123 may be implemented as a keypad configuration that includes a plurality of character keys, number keys, or function keys.

The speaker portion 125 performs a function of outputting the information associated with the operation of the length measuring device 100 into a sound. Specifically, the display 121 may output the information on the length measurement measured at the length measuring device 100 or the current operation mode as a voice.

The microphone portion 127 may perform a function of receiving various commands or information associated with the operation of the length measuring device as a voice.

The strip portion 127 may be composed of a strip 131 and a hook 132.

The strip 131 may have a variety of forms such as a string form, a band form, or a tape form, among other examples.

One end of the strip 131 may be attached to the second rotating portion 162, and after coiled by a plurality of times, may be withdrawn externally through the outlet 111 formed in the casing 110. Then when the operator pulls the hook 132 engaged with the other end of the strip 131 to a direction opposite the outlet 111 (in direction A, FIG. 3), the strip 131 is withdrawn through the outlet 111, while rotating the second rotating portion 162.

The contactless measuring portion 140 may generate laser, infrared rays or ultrasonic waves and receive a reflected signal. Accordingly, it is possible to remotely measure a distance to an object to be measured that is positioned away from the length measuring device 100.

Figure 4:
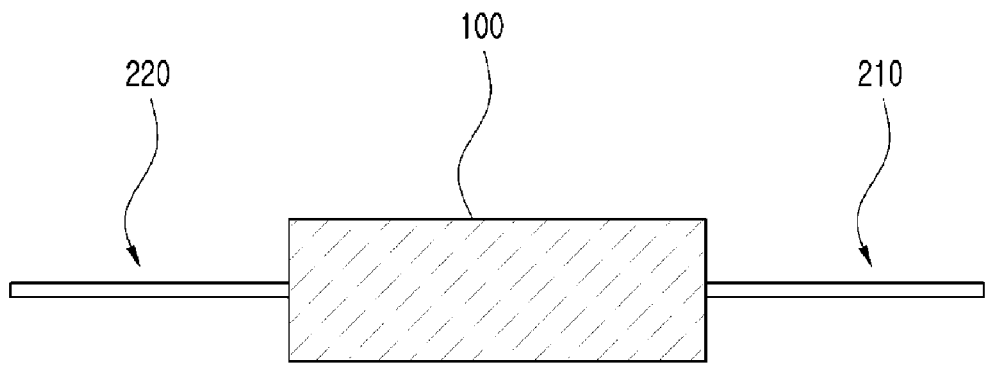
FIG. 4 illustrates an example in which guide lines are marked before and behind a length measuring device according to an exemplary embodiment of the present disclosure.

The laser guide 150 may emit a laser onto the object to be measured to mark a guide line. As illustrated in FIG. 2, when the laser guides 150 are disposed on both sides with reference to the first rotating portion 161, guide lines 210, 220 may be marked before and behind the length measuring device 100, as illustrated in FIG. 4. The accurate length measurement is enabled as the length measuring device is moved along the guide lines 210, 220.

The first rotating portion 161 may be configured to be partially or entirely exposed out of the casing 110 to be in contact with the object to be measured and rotated in direction C or D. For example, when the operator grabs the casing 110 and moves in the direction A, the first rotating portion 161 in contact with the object to be measured is rotated in the direction C. In contrast, when the operator moves the length measuring device 100 in the direction B, the first rotating portion 161 is rotated in the direction D.

The second rotating portion 162 may be rotated in a corresponding direction when the strip 131 is pulled, but may have an elastic member (not illustrated) such as a tension spring or a spring to impart recovery force in a direction of suppressing the withdrawal of the strip 131. Accordingly, when the operator finishes measuring lengths and releases the hook 132, the second rotating portion 162 is rotated in the direction B such that the strip 131 is coiled to be retracted back into the initial position.

The sensing portion 180 may include a first sensing portion and a second sensing portion 182.

The first sensing portion 181 and the second sensing portion 182 may be implemented as a rotation sensor such as a potentiometer sensor, a rotary encoder, and so on, and may each sense an amount of rotation of the first rotating portion 161 and the second rotating portion 162. To this purpose, the first sensing portion 181 and the second sensing portion 182 may be formed on rotational axes of the first rotating portion 161 and the second rotating portion 162, respectively.

The storage 193 may record various information, data and programs associated with the operation of the length measuring device 100 and provide the same in response to the request of the controller 191.

The communication portion 195 may support for the exchange of various information and data in the wired or wireless communication manners between the length measuring device 100 and an external device. The wired communication used herein may include a communication technique that uses universal serial bus (USB) cable, and so on, and the wireless communication may include short distance communication such as Wi-Fi, Bluetooth, Zigbee, Infrared Data Association (IrDA) communication, Ultra Wideband (UWB) or Radio Frequency Identification (RFID), NFC, and so on, or mobile communication such as 3rd Generation (3G), 4th Generation (4G), Long Term Evolution (LTE), and so on.

The power supply 197 performs a function of supplying power necessary for the operations of the respective elements of the length measuring device 100, and may be implemented as a battery.

The gyro sensor portion 199 may perform a function of measuring a posture, moving trajectories, and so on of the length measuring device 100.

The controller 191 controls the overall operation of the length measuring device 100. Specifically, the controller 191 in the strip measure mode may convert the extent by which the strip 131 is withdrawn into a length measurement. Further, the controller 191 in the wheel measure mode may convert an amount of rotation of the first rotating portion 161 into a length measurement, and when in the contactless measure mode, may convert the time during which the laser, infrared rays, ultrasonic waves, and so on generated at the contactless measuring portion 140 are received back.

The controller 191 may display the length measurement through the display 121, or output a sound through the speaker portion 125. Further, the controller 191 may transmit the length measurement to an external device through the communication portion 195.

The controller 191 may record the length measurement in the storage 193. While storing the length measurement, the controller 191 may tag the voice information inputted from the operator through the microphone portion 127. By using a word that can identify the object to be measured to the length measurement as a tag, it is enabled to facilitate the subsequent check on the length measurement of the corresponding object to be measured and also facilitate management of a plurality of length measurement data.

Preferably, the controller 191 may automatically convert the tag information inputted in voice form from the operator into characters using a voice character recognition program, and tag the result to the length measurement and store the same. Meanwhile, the controller 191 may transmit the length measurement together with the tag information of the corresponding length measurement to the external device. Of course, the tag information may be stored in voice form, in which case the external device may convert the voice into characters.

Figure 5:
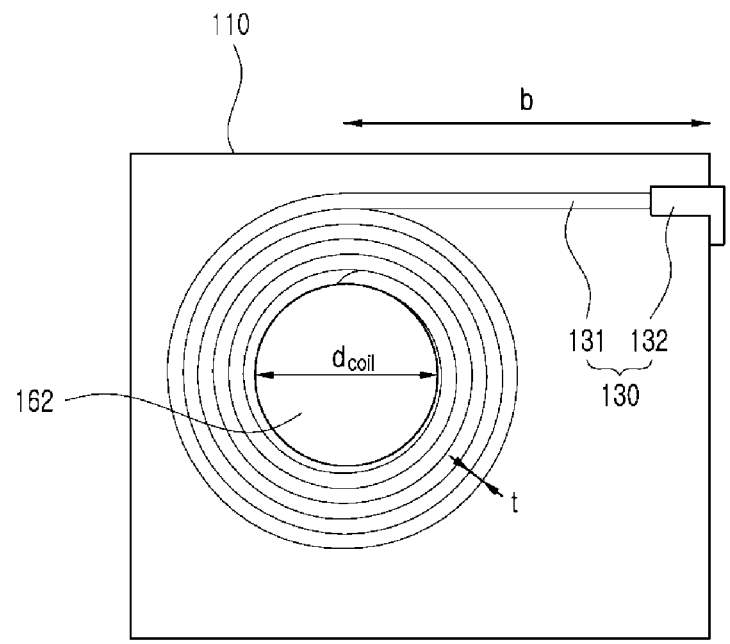
FIG. 5 illustrates a configuration in which a strip is coiled in a length measuring device according to a first exemplary embodiment of the present disclosure.

FIG. 5 illustrates a configuration in which a strip is coiled in a length measuring device according to a first exemplary embodiment of the present disclosure.

As exemplified in FIG. 5, the strip 131 is coiled and stacked a plurality of times onto the second rotating portion 162. Accordingly, the length of the strip 131 is gradually decreased as it is uncoiled in each rotation of the second rotating portion 162.

When the diameter ($d_{coil}$) of the second rotating portion is 32 mm, and the thickness (t) of the strip 131 is 2 mm, the converted diameter ($d'_{coil}$) and circumference (l), reflecting the thickness of the strip 131 being coiled (n) times onto the second rotating portion 162, are listed in Table 1 below. Table 1 lists the numbers obtained until the strip 131 is coiled 15 times.

TABLE 1

| Number of winding (n) | Converted diameter ($d'_{coil}$) | Converted circumference (l) |
| --- | --- | --- |
| 1 | 36 mm | 113.1 mm |
| 2 | 40 mm | 125.7 mm |
| 3 | 44 mm | 138.2 mm |
| 4 | 48 mm | 150.8 mm |
| 5 | 52 mm | 163.4 mm |
| 6 | 56 mm | 175.9 mm |
| 7 | 60 mm | 188.5 mm |
| 8 | 64 mm | 201.1 mm |
| 9 | 68 mm | 213.6 mm |
| 10 | 72 mm | 226.2 mm |
| 11 | 76 mm | 238.8 mm |
| 12 | 80 mm | 251.3 mm |
| 13 | 84 mm | 263.9 mm |
| 14 | 88 mm | 276.5 mm |
| 15 | 92 mm | 289.0 mm |

In FIG. 5, the length (b) represents the length of a portion of the strip 131 that is not coiled onto the second rotating portion 162 in an initial state when the hook 132 is locked in the outlet 111.

By considering also the length (b), the length (f) of the strip 131 being withdrawn out of the outlet 111, the accumulated angle of rotation (j) of the second rotating portion 162, and the length rotation conversion ratio (k) can be obtained as listed in Table 2 below, where k=f/h. In Table 2, it is assumed that the length (b) is 50 mm.

TABLE 2

| No. (i) | Length ($f_i$) | Angle of rotation (h) | Accumulated angle of rotation ($j_i$) | Conversion ratio ($k_i$) |
| --- | --- | --- | --- | --- |
| 1 | 50 mm | 62.3° | 62.3° | 0.803 |
|  | 289.0 mm | 360° | 422.3° | 0.803 |
| 2 | 276.5 mm | 360° | 782.3° | 0.768 |
| 3 | 263.9 mm | 360° | 1142.3° | 0.733 |
| 4 | 251.3 mm | 360° | 1502.3° | 0.698 |
| 5 | 238.8 mm | 360° | 1862.3° | 0.663 |
| 6 | 226.2 mm | 360° | 2222.3° | 0.628 |
| 7 | 213.6 mm | 360° | 2582.3° | 0.593 |
| 8 | 201.1 mm | 360° | 2942.3° | 0.558 |
| 9 | 188.5 mm | 360° | 3302.3° | 0.524 |
| 10 | 175.9 mm | 360° | 3662.3° | 0.489 |
| 11 | 163.4 mm | 360° | 4022.3° | 0.454 |
| 12 | 150.8 mm | 360° | 4382.3° | 0.419 |
| 13 | 138.2 mm | 360° | 4742.3° | 0.384 |
| 14 | 125.7 mm | 360° | 5102.3° | 0.349 |
| 15 | 113.1 mm | 360° | 5462.3° | 0.314 |

No. (i=1) is divided into two parts. The part with length ($f_i$) of 50 mm corresponds to a portion of the strip 131 that is not coiled onto the second rotating portion 162 in the initial state, and the part with length ($f_i$) of 289.0 mm corresponds to a portion of the strip 131 that was coiled on the outermost part (i.e., the part corresponding to the 15th winding in Table 1) and released therefrom. Accordingly, when the strip 131 is released until the outermost part of the coil in the initial state, the accumulated angle of rotation ($j_i$) is 422.3°. Then the strip 131 is withdrawn by 0.803 mm each time the second rotating portion 162 is rotated by 1°.

Then, from the interval corresponding to No. (i=2) to the interval corresponding to No. (i=15), while applying the conversion ratio ($k_i$) that is decreased in a stepwise pattern as exemplified in Table 2, the amount of rotation of the second rotating portion 162 may be converted into a length measurement, as expressed in Mathematical Equation 1 below.

As noted above, the interval corresponding to No. (i=1) is divided into two parts. Accordingly, by applying $f_1$=339.0 mm(=50 mm+289.0 mm), $j_1$=422.3°, and by also applying Mathematical Equation 1 below, the length measurement ($f_{final}$) may be calculated accurately.

$$f_{final} = \sum_{i=0}^{i-1} f_i + (A - j_{i-1}) \cdot k_i$$ [Mathematical Equation 1]

where A denotes an amount of rotation of the second rotating portion 162 as measured at the second sensing portion 182. For example, A means a total amount of rotation that is measured in the wheel measure mode, while rotating the second rotating portion 162 in contact with the object to be measured, until the measuring operation is stopped.

Figure 6:
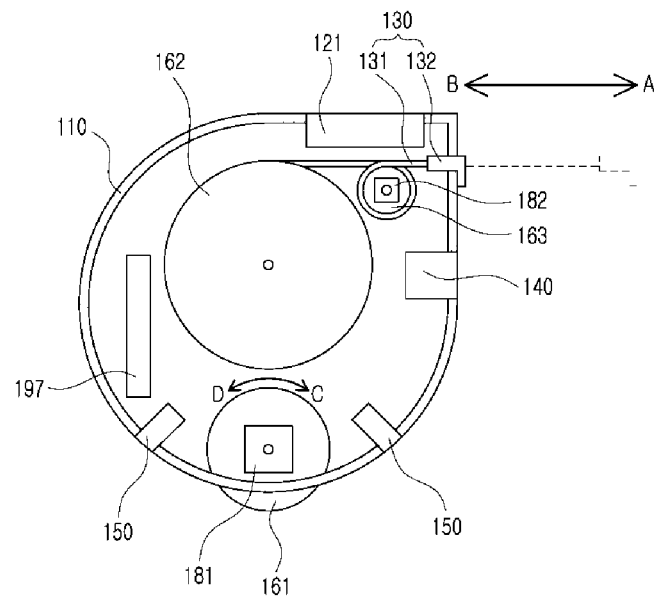
FIG. 6 illustrates an arrangement of main elements inside a length measuring device a second exemplary embodiment of the present disclosure.
Figure 7:
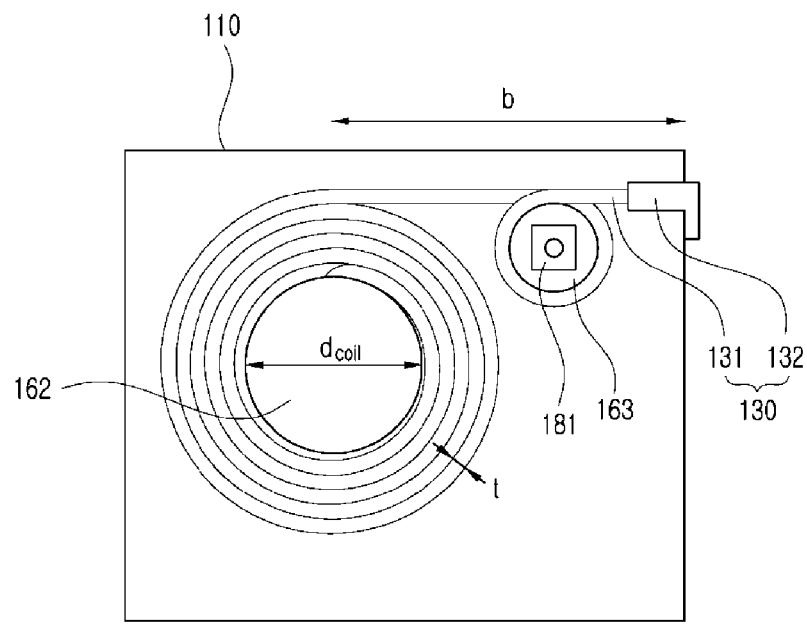
FIG. 7 illustrates a configuration in which a strip is coiled in a length measuring device according to a second exemplary embodiment of the present disclosure.

FIG. 6 illustrates an arrangement of main elements inside a length measuring device a second exemplary embodiment of the present disclosure, and FIG. 7 illustrates a configuration in which a strip is coiled in a length measuring device according to a second exemplary embodiment of the present disclosure.

According to a second exemplary embodiment, it is possible to measure the length accurately according to withdrawal or retraction of the strip 131 without requiring the complicated calculation as described with reference to Mathematical Equation 1 above.

The length measuring device according to the second exemplary embodiment may have the same elements as the length measuring device according to the first exemplary embodiment, except that the length measuring device according to the second exemplary embodiment may additionally include a third rotating portion 163 and has the second sensing portion 182 on a rotational axis of the third rotating portion 163 so that the second sensing portion 182 measures the amount of rotation of the third rotating portion 163.

The strip 131 may be structured such that the strip 131 may be attached, with one end, to the second rotating portion 162, coiled a plurality of times, and then coiled onto the third rotating portion once. Accordingly, when the operator pulls the hook 132 engaged with the other end of the strip 131, the strip 131 may be withdrawn out of the casing 110, through the outlet 111, with simultaneously rotating the second rotating portion 162 and the third rotating portion 163.

As described above, because the strip 131 is coiled and stacked onto the second rotating portion 162, the length of the strip 131 being withdrawn in each rotation of the second rotating portion 162 upon release of the strip 131 is gradually decreased. In contrast, the length of the strip 131 being withdrawn in each rotation of the third rotating portion 163 is maintained equal.

Accordingly, without using the complicated calculation such as Mathematical Equation 1, it is possible to calculate the length measurement by causing the second sensing portion 182 to sense the amount of the third rotating portion 163, rather than that of the second rotating portion 162, and then converting the sensed result.

Figure 8:
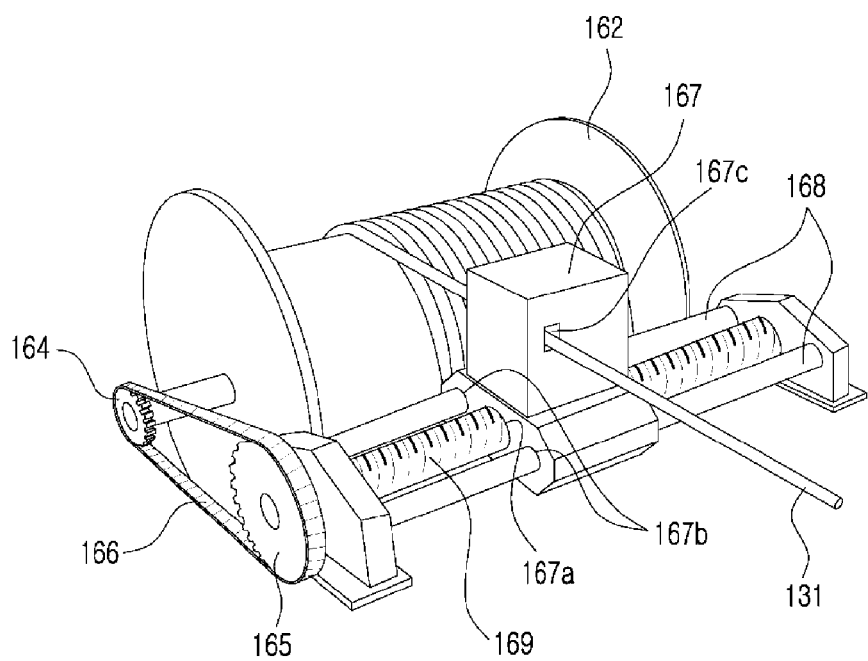
FIG. 8 illustrates a configuration in which a strip is coiled in a length measuring device according to a third exemplary embodiment of the present disclosure.

FIG. 8 illustrates a configuration in which a strip is coiled in a length measuring device according to a third exemplary embodiment of the present disclosure.

The length measuring device according to the third exemplary embodiment may have the same electrical elements as the elements of the length measuring device, except that the length measuring device according to the third exemplary embodiment may modify the structure of the second rotating portion 162 according to the first exemplary embodiment into a form as illustrated in FIG. 8.

In the third exemplary embodiment, the second rotating portion 162 may be implemented as a bobbin form onto which the strip 131 can be coiled sequentially by a plurality of times without overlapping, along the axis of rotation. Of course, in order to allow the strip 131 to be automatically re-coiled after withdrawal, the second rotating portion 162 may be configured with a recovery force acting reversely to the direction in which the strip 131 is withdrawn.

The length measuring device according to the third exemplary embodiment may additionally include a first gear 164, a second gear 165, a chain 166, a moving member 167, a fixing bar 168, and a rotating bar 169, in order to allow the strip 131 to be sequentially coiled onto the second rotating portion 162 and released without being overlapped, along the rotational axis of the second rotating portion 162.

The first gear 164 is formed on the rotational axis of the second rotating portion 162 to be rotated together when the second rotating portion 162 is rotated.

The second gear 165 is engaged with the first gear 164 through the chain 166, and formed on the rotational axis of the rotating bar 169. The second gear 165 rotated together upon rotation of the first gear 164, to thus rotate the rotating bar 169.

The rotating bar 169 has a thread formed on a circumference thereof, and is rotated according to the rotation of the second gear 165.

The rotational axis of the rotating bar 169, and the rotational axis of the second rotating portion 162 have parallel directions.

The moving member 167 may include a first hole 167a through which the rotating bar 169 is passed, a second hole 167b through which the fixing bar 168 is passed, and a third hole 167c through which the strip 131 is passed.

The first hole 167a may have a thread formed to be meshed with the thread formed on the rotating bar 169. The thread formed on the first hole 167a has a function of moving the moving member 167 to a direction of the rotational axis of the rotating bar 169 upon rotation of the moving bar 169.

The second hole 167b has a function of guiding the moving member 167 such that the moving member 167 can move along the rotating bar 169 stably without swaying. While FIG. 8 illustrates the second holes 167b on both sides of the first hole 167a, depending on exemplary embodiments, the second hole 167b may be formed on only one side of the first hole 167a.

The moving member 167 is moved according to the rotation of the rotating bar 169 to perform a function of guiding the strip 131 so that the strip 131 is sequentially coiled onto the rotational axis of the second rotating portion 162. The moving member 167 may include a means such as roller, and so on at the third hole 167c to allow the strip 131 to be withdrawn and retracted without generating frictional force.

Because the extent by which the moving member 167 is moved along the rotating bar 169 upon one rotation of the second rotating portion 162 is varied according to a gear ratio of the first gear 164 and the second gear 165, the gear ratio of the first gear 164 and the second gear 165 may be selected properly to allow the moving member 167 to be moved according to the rotation of the rotating bar 169, while guiding the strip 131 such that the strip 131 is sequentially coiled onto the second rotating portion 162 without overlapping.

Figure 9:
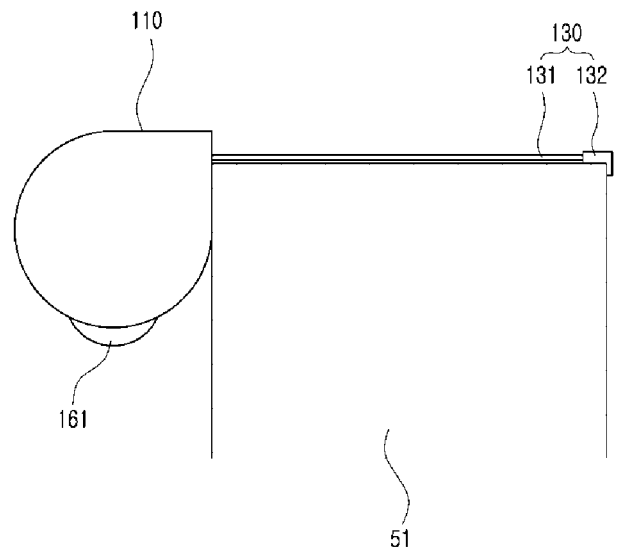
FIG. 9 exemplifies a method for measuring a straight length of an object to be measured according to an exemplary embodiment of the present disclosure.

FIG. 9 exemplifies a method for measuring a straight length of an object to be measured according to an exemplary embodiment of the present disclosure.

Referring to FIG. 9, when the operator fixes the hook 132 at a corner of the object to be measured 51 and pulls it while grabbing the casing 110 in his or her hand, the rotator provided inside with the strip coiled thereon is rotated according to the withdrawal of the strip, and it is possible to measure the straight length of the object to be measured 51 by sensing the amount of rotation of the rotator. Of course, any of the other various methods may be used to withdraw the strip 131 and measure the length of the object to be measured.

Figure 10:
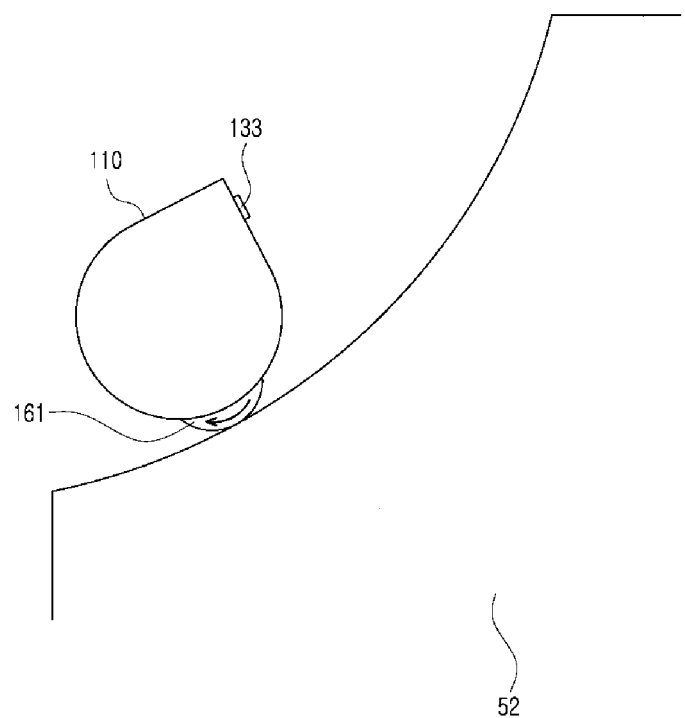
FIG. 10 exemplifies a method for measuring a curved length of an object to be measured according to an exemplary embodiment of the present disclosure.
Figure 1:
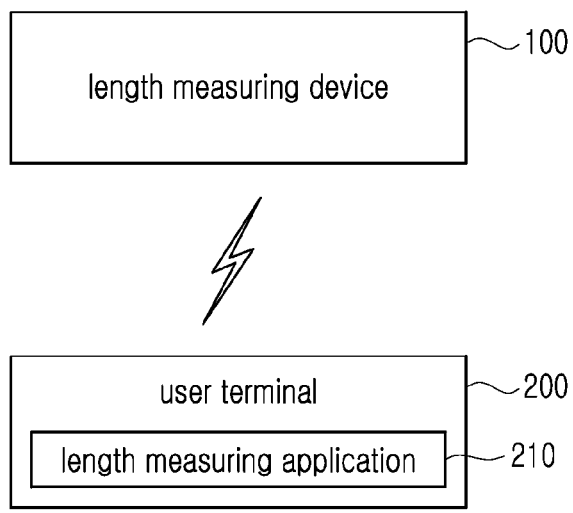
Figure 1:
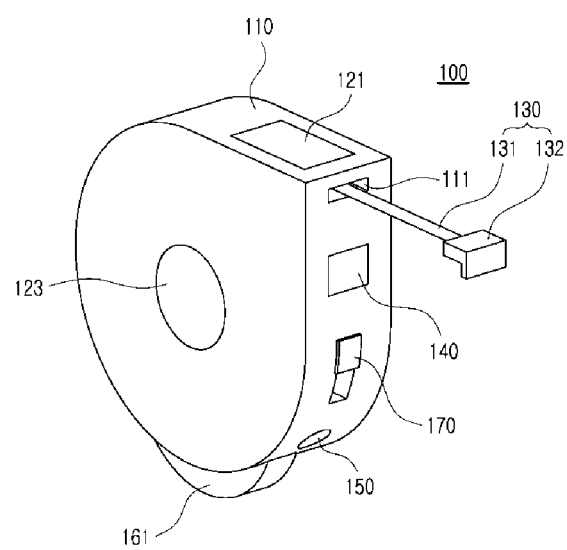

FIG. 10 exemplifies a method for measuring a curved length of an object to be measured according to an exemplary embodiment of the present disclosure.

Referring to FIG. 10, the strip 131 is retracted into the casing 110 and the hook 133 is locked in the outlet 111. When the operator grabs the casing 110, contacts a portion of the circumference of the first rotating portion 161 from a beginning point of the object to be measured 52 to an end thereof, and then pulls or pushes the same, the first rotating portion 161 is rotated, and it is possible to sense the extent of rotation of the first rotating portion 161 and measure the curved length. There is an advantage that the curved length can be measured with accuracy even when the object to be measured 52 is positioned inside as illustrated in FIG. 10.

FIG. 11 illustrates a configuration of a length measuring system according to an exemplary embodiment of the present disclosure.

Referring to FIG. 11, a length measuring system according to an exemplary embodiment of the present disclosure is composed of a length measuring device 100 and a user terminal 200. The length measuring device 100 may utilize a variety of apparatuses described above.

The user terminal 200 may be composed of a terminal having a mobile communication function and operation capability with a memory means and a microprocessor, such as a personal computer (PC), a smart phone, a tablet PC, a personal digital assistant (PDA) or a web pad, and can provide a variety of services to operator with a variety of applications.

Specifically, the user terminal 200 according to an exemplary embodiment may be installed with a length measuring application 210 that is automatically executed in response to a user signal transmitted from the length measuring device 100 and receive a length measurement. The received length measurement may be automatically inputted into the length measuring application 210 or stored.

For example, when the operator requests the user terminal 200 through the input/output portion 120 provided on the length measuring device 100 for transmission of a length measurement, the length measuring application 210 of the user terminal 200 may be automatically executed, and the length measuring application 210 may display a plurality of cells to receive an input of the length measurement such that a cell to receive an input of length measurement can be selected. Further, when the input/output portion 120 of the length measuring device 100 is composed of a plurality of buttons, each of the buttons may act as a hot key to allow automatic input of a length measurement to the length measuring application 210 or a cell corresponding to the length measuring application 210.

In addition, when the length measuring device 100 includes a gyro sensor portion 199 to sense an angle of measuring the object to be measured, the user terminal 200 may receive an input of the angle measurement sensed at the gyro sensor portion 199 as well as the length measurement from the length measuring device 100, and the length measurement is automatically inputted into the length measuring application 210 according to the angle measurement. In this case, it is possible to automatically perceive the straight and curved lines, using the angle measurement of the object to be measured sensed at the gyro sensor portion 199.

For example, in order to take body measurements of the operator, the operator may measure around his or her neck with the length measuring device 100 and transmit the result to the user terminal 200. Accordingly, the length measuring application 210 may be executed to display a screen for taking numbers corresponding to the body measurements of the operator, i.e., display a plurality of cells to input a leg length, a neck size, a shoulder width of the operator, and according to the angle measurement (in horizontal direction) sensed at the gyro sensor portion 199, the number may be automatically sensed as belonging to the neck size of the body measurements of the operator, in which case the number corresponding to the neck size can be automatically inputted to a corresponding cell to be displayed or stored. In addition, when the length measuring device 100 measures the leg length of the operator, according to the angle measurement (in vertical direction) sensed at the gyro sensor portion 199, the number may be automatically sensed as belonging to the leg length among the body measurements of the operator, in which case the number corresponding to the leg length may be automatically inputted into a corresponding cell to be displayed or stored. Meanwhile, the number corresponding to the length measurement may be stored together with the angle information (e.g., moving trajectories of the length measuring device 100, and so on) at the time of taking the length measurement such that it is possible to acquire not only the length information, but also the shape information around the object to be measured.

The length measurement is automatically inputted into the length measuring application 210 according to a voice signal of the operator inputted through the microphone portion 127. That is, in response to the operator's voice signal, the length measurement may be automatically inputted into a corresponding cell of a plurality of cells to be displayed or stored. After the length measuring device 100 finishes measuring, when the operator selects to transmit it by pressing the button portion 123 provided on the length measuring device 100, it is possible to tag the voice signal of the operator to indicate which location the length measurement corresponds to. For example, while transmitting the length measurement to the user terminal 200, the voice signal "waist" of the operator may be transmitted together, in which case the length measuring application 210 may perceive it to be associated with the waist using the voice recognition program such that the length measurement is automatically inputted into a cell corresponding to the waist and stored.

Meanwhile, the length measuring device 100 may additionally include an element such as a GPS transmitter/receiver, a pressure sensing portion (not illustrated), and so on. For example, the GPS transmitter/receiver may receive the location information associated with the measured place and store the received information in the storage 193 or transmit the received information to the user terminal 200 for the operator to check the length measurement along with the information on the location of measurement.

Figure 13:
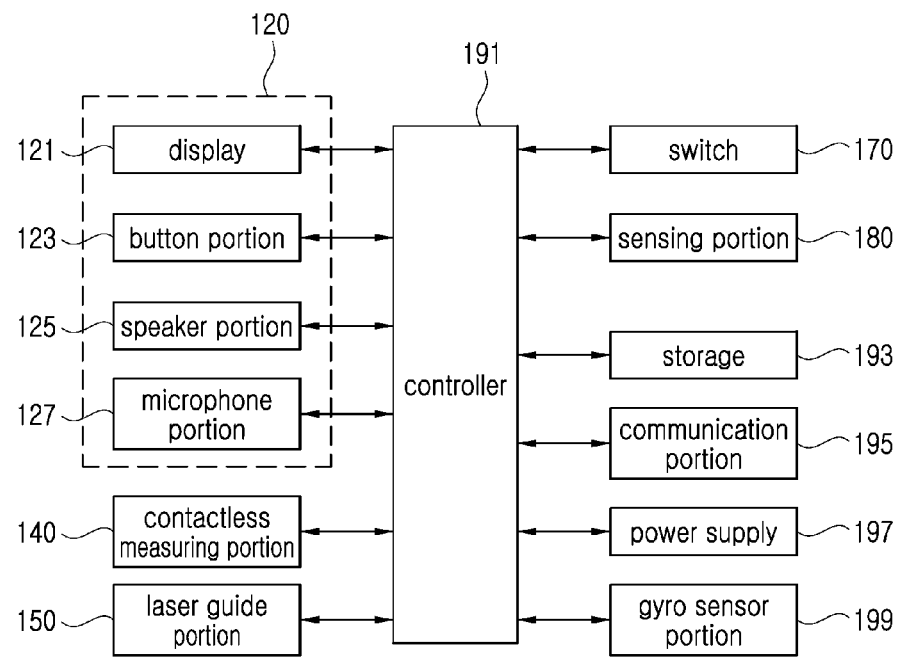
FIG. 13 illustrates electric elements of a length measuring device according to another exemplary embodiment of the present disclosure.
Figure 14:
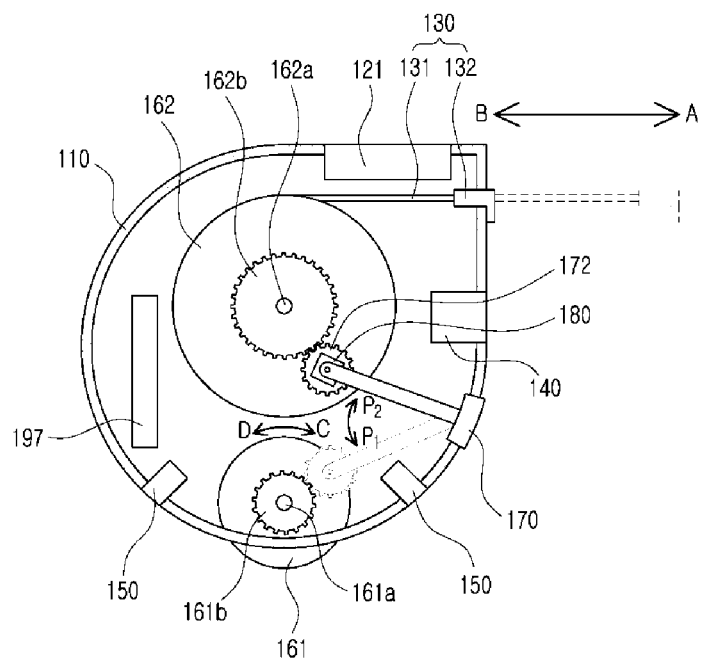
FIG. 14 illustrates relationships with which main elements of a length measuring device are disposed inside a casing, according to a fourth exemplary embodiment of the present disclosure.

FIG. 12 is a schematic perspective view of a length measuring device according to another exemplary embodiment of the present disclosure, FIG. 13 illustrates electric elements of a length measuring device according to another exemplary embodiment of the present disclosure, and FIG. 14 illustrates relationships with which main elements of a length measuring device are disposed inside a casing, according to a fourth exemplary embodiment of the present disclosure.

The length measuring device according to a fourth exemplary embodiment as illustrated in FIGS. 12 to 14 have almost the same elements as the length measuring device illustrated in FIGS. 1 to 3. Accordingly, the like elements with the same functions as those illustrated in FIGS. 1 to 3 of the length measuring device will be given the same reference numerals and the detailed description thereof will be referenced to the exemplary embodiments described above, while only the discriminative elements will be mainly described below.

According to the fourth exemplary embodiment of the present disclosure, the length measuring device 100 may additionally include a switch 170 to receive from the operator a command to set an operation mode of the length measuring device 100. For example, when the operator moves the switch 170 up, the operation may be set to the length measure mode that is based on the strip 131 (hereinbelow, 'strip measure mode'), while, when the operator moves the switch 170 down, the length measure mode that is based on the amount of rotation of the first rotating portion 161 (hereinbelow, 'wheel measure mode') may be selected and implemented. The method for setting the operation mode according to the position of the switch 170 will be described in detail below.

The switch may be provided in the casing 110 and moved to the first position ($P_1$) or the second position ($P_2$) according to the switching operation. For example, when the operator moves the switch 170 to the first position ($P_1$) (i.e., when the operator moves the switch 170 down), the length measure mode based on the amount of rotation of the first rotating portion 161 (hereinbelow, 'wheel measure mode') may be selected, and when the operator moves the switch 170 to the second position ($P_2$) (i.e., when the operator moves the switch 170 up), the length measure mode based on the amount of rotation of the second rotating portion 162 (hereinbelow, 'strip measure mode') may be selected. As another example, the switch 170 may be formed as a toggle switch that switches on and off.

The first rotating portion 161 may be exposed partially or entirely out of the casing 110 such that it 161 may be rotated in a direction C or D while being in contact with the object to be measured. For example, when the operator grabs the casing 110 and moves it to the direction A, the first rotating portion 161 in contact with the object to be measured rotates in the direction C. In contrast, when the operator moves the length measuring device 100 to the direction B, the first rotating portion 161 is rotated in the direction D.

The first rotating portion 161 may have a first rotational axis 161a at a center, and a first rotating gear 161b formed thereon to be rotatably moved about the first rotational axis 161a.

The second rotating portion 162 may be rotated in a corresponding direction upon pulling of the strip 131, and may be provided with an elastic member (not illustrated) such as a tension spring, spring, and so on to have a recovery force acting in a direction that suppresses the withdrawal of the strip 131. Accordingly, when the operator releases the hook 132 upon finishing measuring lengths, the second rotating portion 162 is rotated in the direction B such that the strip 131 is coiled back and retracted to the interior.

The second rotating portion 162 may have a second rotational axis 162a formed at a center, and a second rotating gear 162b formed to be rotatably moved about the second rotational axis 162a.

The third rotating gear 172 may be connected to the switch 170 to be meshed with the first rotating gear 161b or the second rotating ear 162b according to switching operation of the switch 170. The third rotating gear 172 may be rotated in mesh with the first rotating gear 161b when the switch 170 is in the first position ($P_1$), while the third rotating gear 172 may be rotated in mesh with the second rotating gear 162b when the switch 170 is in the second position ($P_2$).

The sensing portion 180 may be configured as a rotation sensor such as a potentiometer sensor or a rotary encoder, and may sense the amount of rotation of the third rotation gear 172. To this end, the sensing portion 180 may be formed at the rotational axis of the third rotating gear 172.

More specifically, when the switch is in the first position ($P_1$), the third rotating gear 172 may be rotated in mesh with the first rotating gear 161b to thus allow the sensing portion 180 to sense the amount of rotation of the first rotating portion 161, and when the switch is in the second position ($P_2$), the third rotating gear 172 may be rotated in mesh with the second rotating gear 162b to thus allow the sensing portion 180 to sense the amount of rotation of the second rotating portion 162.

The controller 191 controls the overall operations of the length measuring device 100. Specifically, the controller 191 may convert the amount of rotation of the third rotating gear 172 into length measurement.

Although not illustrated in the drawings, there may be electrical connection between the controller 191 and the switch 170 such that the controller 191 may perceive the position (first position or second position) of the switch 170 and perform an operation mode according to the position of the switch 170. For example, the controller 191 may perceive it when the switch 170 is moved to the first position ($P_1$) such that the operation may be performed in the length measure mode (hereinbelow, 'wheel measure mode') based on the amount of rotation of the first rotating portion 161. The controller 191 may also perceive it when the switch 170 is moved to the second position ($P_2$) such that the operation may be performed in the length measure mode (hereinbelow, 'strip measure mode') based on the amount of rotation of the second rotating portion 162.

In the strip measure mode, the controller 191 may sense the amount of rotation of the second rotating portion 162 (i.e., amount of rotation of the third rotating gear 172) using the sensing portion 180 formed at the rotational axis of the third rotating gear 172 in mesh with the second rotating gear 162b, and convert the extent by which the strip 131 is withdrawn into the length measurement. Further, in the wheel measure mode, the controller 191 may use the sensing portion 180 formed at the rotational axis of the third rotating gear 172 in mesh with the first rotating gear 161b to convert the amount of rotation of the first rotating portion 161 (i.e., amount of rotation of the third rotating gear 172) into length measurement. In the contactless measure mode, the contactless measuring portion 140 may measure, for example, the time during which the laser, infrared rays or ultrasonic waves, and so on are generated and then received back, and convert the same into length measurement.

Figure 15:
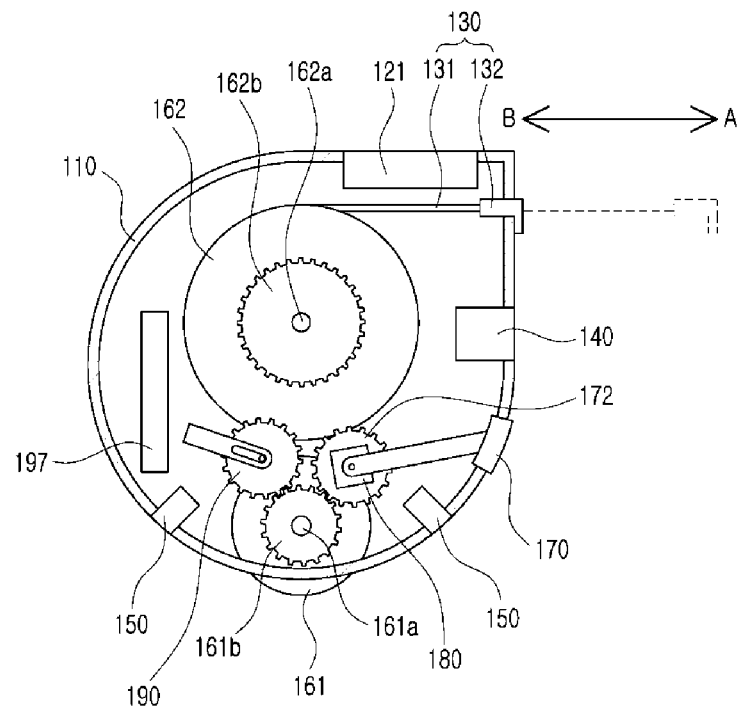
FIGS. 15 and 16 illustrate relationships with which main elements of a length measuring device are disposed inside casing, according to a fifth exemplary embodiment of the present disclosure.
Figure 16:
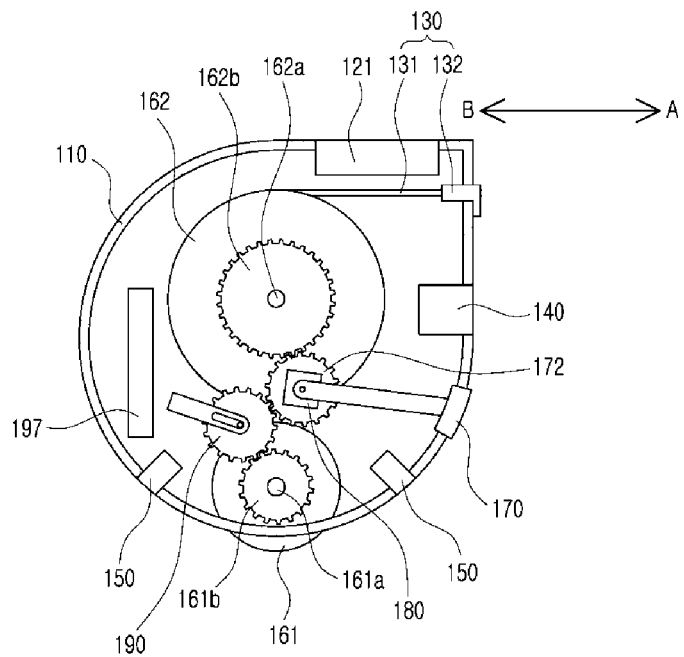

FIGS. 15 and 16 illustrate relationships with which main elements of a length measuring device are disposed inside casing, according to a fifth exemplary embodiment of the present disclosure.

Referring to FIGS. 15 and 16, the length measuring device 100 according to a fifth exemplary embodiment may additionally include a fourth rotating gear 190 in mesh with the first rotating gear 161b, compared to the length measuring device according to the fourth exemplary embodiment.

As illustrated in FIG. 15, when the switch 170 is in the first position ($P_1$) (i.e., when the wheel measure mode is selected), the fourth rotating gear 190 may be meshed with the third rotating gear 172 as well as the first rotating gear 161b. In this case, the second rotating gear 162b, which is separated from the rest of the rotating gears, will not be influenced even when the first rotating portion 161 is rotated.

Meanwhile, as illustrated in FIG. 16, when the switch 170 is in the second position ($P_2$) (i.e., when the strip measure mode is selected), the fourth rotating gear 190 may be meshed with the first rotating gear 161b, and also the third rotating gear 172 in mesh with the second rotating gear 162b. Accordingly, in the strip measure mode, the first rotating gear 161b, the second rotating gear 162b, the third rotating gear 172, and the fourth rotating gear 190 may be interoperatively rotated.

Additionally, the length measuring device 100 may include a hook fitting hole (not illustrated) to which the hook 132 is fit. For example, when the operator intends to operate the length measuring device 100 in the strip measure mode to measure the waist size, the operator may arbitrarily withdraw the strip 131 considering the waist size, surround the waistline with the withdrawn strip 131, and then fit the hook 132 in the hook fitting hole and measure the waist size. However, because the strip 131 is withdrawn by the guesswork of the operator, there may be an error in the length, and in order to reduce such error, a procedure is necessary to maintain the strip 131 around the waistline tight. To do this, while surrounding the strip 131 along the waistline, the operator may rotate the first rotating portion 161 in a direction opposite the direction in which the strip 131 is being withdrawn, such that the rotation of the first rotating gear 161b would cause the fourth rotating gear 190, the third rotating gear 172, and the second rotating gear 162b to be sequentially interoperated to be rotated in a reverse direction. As a result, the strip 131 is retracted into the casing 110, thus tightly surrounding the waistline.

As described above, it is possible to take accurate waist size measurement because the length measurement are taken with the strip 131 tightly surrounding the waistline.

Meanwhile, as illustrated in FIG. 5, considering that the length of the strip 131 being released is gradually decreased per rotation of the second rotating portion 162 when the strip 131 is coiled and stacked onto the second rotating portion 162 by a plurality of times, the length measuring devices according to the fourth and fifth exemplary embodiments may also be implemented to have a conversion ratio for converting unit amount of rotation into length that is decreased stepwise at predetermined intervals, by applying the algorithm as Mathematical Equation 1. Alternatively, as illustrated in FIG. 6, the length measuring device may be additionally provided with the third rotating portion 163, and convert the amount of rotation of the third rotating portion 163 instead of that of the second rotating portion 162, into length measurement, or as illustrated in FIG. 8, the second rotating portion 162 may be implemented to eliminate a need for complicated calculation as Mathematical Equation 1.

Figure 17:
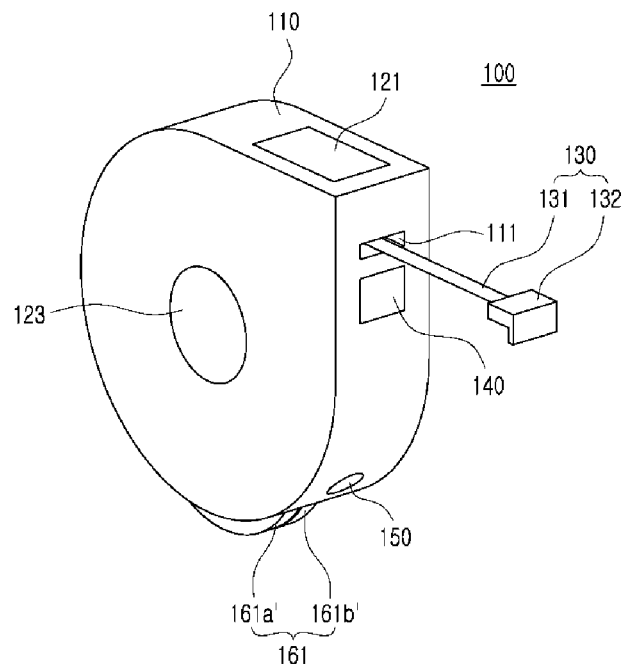
FIGS. 17 and 18 are schematic perspective views of a length measuring device according to yet another exemplary embodiment of the present disclosure.
Figure 18:
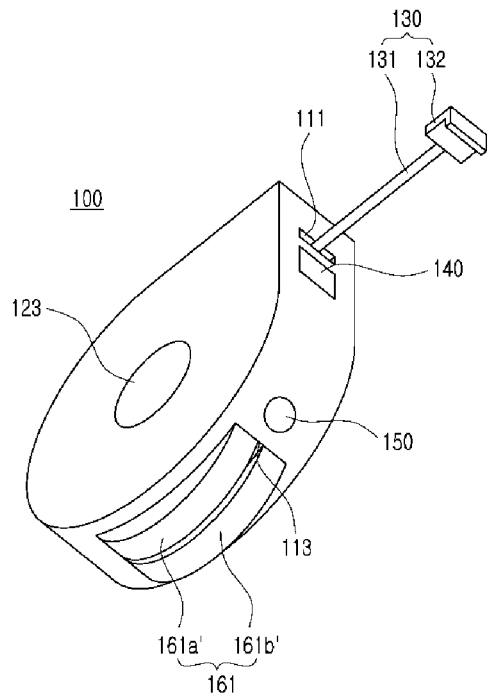
Figure 19:
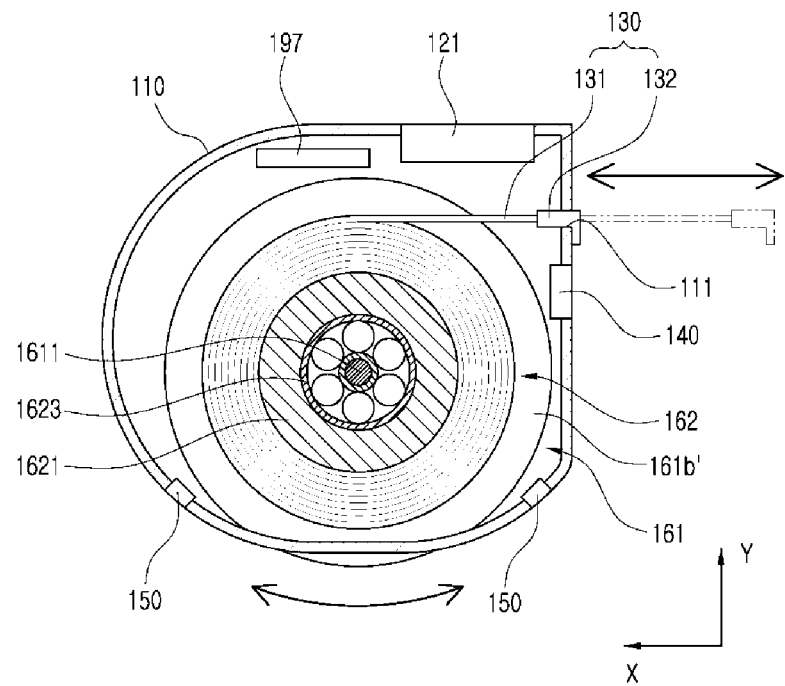
FIGS. 19 and 20 illustrate relationships with which main elements of a length measuring device are disposed inside a casing, according to a sixth exemplary embodiment of the present disclosure.
Figure 20:
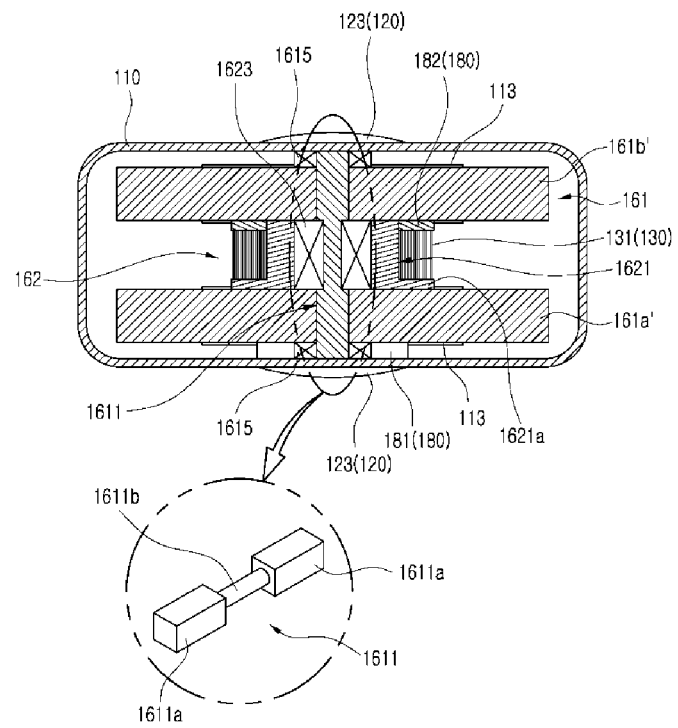

FIGS. 17 and 18 are schematic perspective views of a length measuring device according to yet another exemplary embodiment of the present disclosure, and FIGS. 19 and 20 illustrate relationships with which main elements of a length measuring device are disposed inside a casing, according to a sixth exemplary embodiment of the present disclosure.

The length measuring device according to the sixth exemplary embodiment as illustrated in FIGS. 17 to 20 have almost the same elements as the length measuring device illustrated in FIGS. 1 to 3. Accordingly, the like elements with the same functions as those of the length measuring device illustrated in FIGS. 1 to 3 will be given the same reference numerals, and the detailed description thereof will be referenced to the embodiments provided above with reference to FIGS. 1 to 3, while only the discriminative elements will be mainly described below.

The length measuring device 100 according to the sixth exemplary embodiment has the same electrical elements as the elements illustrated in FIG. 3.

Referring to FIGS. 17 and 18, in the length measuring device 100 according to the sixth exemplary embodiment, the casing 110 has a function of accommodating and protecting the respective elements of the length measuring device 100 therein, and may be provided with a passing hole 113 through which a portion of driving wheels 161a', 161b' (to be described) of the first rotating portion 161 accommodated in the casing 110 is projected, and an outlet 111 through which the strip 131 coiled on the second rotating portion 162 is withdrawn and retracted.

Although not illustrated in the drawings, for example, there may be a plurality of passing holes 113 along the circumference of the casing 110. Accordingly, the driving wheels 161a', 161b' of the first rotating portion 161 may be exposed out of the casing 110 through a plurality of locations such that through these, the operator is enabled to freely grab the length measuring device 100 and also measure the length of the object to be measured with various methods.

Referring to FIGS. 19 and 20, the length measuring device 100 according to the sixth exemplary embodiment includes a first rotating portion 161 accommodated in the casing 110, which is partially exposed out of the casing 110 to be in contact with the object to be measured, and moved along the surface of the object to be measured.

The first rotating portion 161 may include a rotational axis 1611 passed through the casing 110.

The rotational axis 1611 may be passed through the casing 110 to fix both the first rotating portion 161 and the second rotating portion 162 on the casing 110 together, and may be simultaneously rotated with the first rotating portion 161.

More specifically, the rotational axis 1611 may include a first coupling portion 1611a in a shape of a polygonal column and coupled with the driving wheels 161a', 161b', and a second coupling portion 1611b in a shape of a cylindrical column extended from an end of the first coupling portion along the direction of the axis and coupled with the second rotating portion 162 to be described below.

That is, the rotational axis 1611 may be formed such that one side thereof to be coupled with the first rotating portion 161 has a polygonal column shape, and the other side thereof to be coupled with the second rotating portion 162 has a cylindrical column shape to thus allow the second rotating portion 162 to be independently driven without being influenced by the rotation of the first rotating portion 161 when the first rotating portion 161 is rotated.

Further, the first rotating portion 161 may include the driving wheels 161*a'*, 161*b'* coupled with the rotational axis 1611 and disposed inside the casing 110, and rotated in contact with the surface of the object to be measured and moved along the surface of the object to be measured.

There may be a plurality of driving wheels 161*a'*, 161*b'* provided inside the casing 110, being spaced apart by preset intervals along the direction of the axis, and intervened by the second rotating portion 162 (to be described) disposed between a plurality of spaced-apart driving wheels 161*a'*, 161*b'*. For example, although not illustrated in the drawings, a coupling hole (not illustrated) corresponding to an outer surface of the first coupling portion 1611*a* may be formed in the driving wheels 161*a'*, 161*b'* to be engaged with the first coupling portion 1611*a* of the rotational axis 1611.

In this example, the driving wheels 161*a'*, 161*b'* may be coated. That is, the surfaces of the driving wheels 161*a'*, 161*b'* may be applied with a coating fluid prepared in advance that allows the driving wheels 161*a'*, 161*b'* to be precisely moved along the surface of the object to be measured without losing grip force with the object to be measured.

Further, the first rotating portion 161 may additionally include a rotational axis support bearing 1615 formed in the casing 110 to support the rotational axis 1611.

Meanwhile, the length measuring device 100 includes the second rotating portion 162 coupled with the first rotating portion 161, and has the strip 131 coiled thereon to be withdrawn out of the casing 110 according to a length of the object to be measured.

The second rotating portion 162 may include a drum 1621 coupled with the second coupling portion 1611*b* of the rotational axis 1611 to be individually driven with the rotational axis 1611, separately from the driving wheels 161*a'*, 161*b'* of the first rotating portion 161.

A guide portion 1621*a* may be formed at an end of the drum 1621 to support the strip portion 130 in the direction of axis. Accordingly, even with the repeated withdrawal and retraction, the strip portion 130 is guided by the guide portion 1621*a* to be stably coiled onto the drum 160 without being separated from the drum 1621.

For example, although not illustrated in the drawings, the drum 1621 may accommodated therein an elastic member (not illustrated) wound into a coil shape and connected with the strip portion 130. Accordingly, the elastic member may be compressed when the strip 131 is withdrawn out of the casing, and when the measuring is completed and the strip 131 is released from the withdrawn state, recovered back to original shape by the elastic force to thus cause the externally-withdrawn strip 131 back into the casing 110 to the coiled state on the drum 1621.

Further, the second rotating portion 162 may include a strip portion 130 coiled around the drum 1621 to be withdrawn out of the casing 110 through the outlet 111 of the casing during measuring, while rotating the drum 1621.

The strip portion 130 may include a strip 131 coiled around the drum 1621, and a hook 132 coupled with an end of the strip 131 and maintained being partially exposed out of the casing 110, that is, maintained being hooked on the outlet 111.

The strip 131 may be formed of a material that can independently maintain straightness within a preset length during withdrawal, and to further maximize this, the strip 131 may be fabricated to have an arch cross section when viewed in a direction of withdrawal.

The strip 131 may have a variety of forms such as string, band, tape, and so on.

The hook 132 may be in such a form that is securely hooked in an end of the object to be measured so that an end of the strip portion 130 can be in exact alignment with an end of the object to be measured.

For example, the hook 132 may be fabricated into a ring shape such as "¬" or " ⌐ " which is partially bent perpendicularly.

Further, the second rotating portion 162 may further include a drum support bearing 1623 disposed between the drum 1621 and the second coupling portion 1611*b* to support the drum 1621.

That is, the driving wheels 161*a'*, 161*b'* of the first rotating portion 161, and the drum of the second rotating portion 162 may respectively be coupled with the inner and outer sides of the drum support bearing 1623 to be individually driven.

Referring to FIG. 3, in a length measuring device 100 according to a sixth exemplary embodiment, the sensing portion 189 may include a first sensing portion 181 to sense an amount of rotation of the driving wheels 161*a'*, 161*b'*, and a second sensing portion 182 to sense an amount of rotation of the drum 1621.

After the driving wheels 161*a'*, 161*b'* are coupled, the first sensing portion may be coupled with an end of the rotational axis 1611 projecting outward along the direction of axis by a predetermined length to sense the amount of rotation of the driving wheels 161*a'*, 161*b'*.

The second sensing portion 182 may be coupled with an end of the drum 1621 to sense an amount of rotation of the drum 1621.

More specifically, the second sensing portion 182 may be coupled with the other side of the drum 1621 to correspond to the guide portion formed on one side of the drum 1621 to support the strip portion 130 in conjunction with the guide portion 1621*a*, and to sense the amount of rotation of the drum 1621 at the same time.

The button portion 123 may receive a command to set an operation mode of the length measuring device 100 from the operator. For example, when the operator presses the button portion 123 once, the operation may be selected to be the length measure mode based on the strip 131. Pressing the button portion 123 twice may select the length measure mode based on the amount of rotation of the driving wheels 161*a'*, 161*b'*, and pressing three times may select the length measure mode based on the contactless measuring portion 140 which will be described below. Of course, the button portion 123 other than those exemplified herein may also be implemented according to exemplary embodiments to receive a variety of commands associated with the operation of the length measuring device 100 from the operator.

Meanwhile, an exemplary embodiment may be implemented to receive a command from the operator through the first rotating portion 161. For example, pressing the button portion 123 may display an initial menu on the display 121 such that the operator may select a sub menu while rotating the driving wheels 161*a'*, 161*b'* of the first rotating portion. In one example, pressing the button portion 123 once may display one of the three length measure modes such that the operator may change the length measure mode displayed on the display 121 by rotating the driving wheels 161a', 161b' of the first rotating portion 161. While a specific length measure mode is being displayed on the display 121, when the operator presses the button portion 123 again, a corresponding mode may be selected and the length measuring device 100 according to the exemplary embodiment may be operated in the selected mode. Of course, an exemplary embodiment other than those described herein may be implemented, in which the operator may input corresponding commands by selectively operating the button portion 123 and the first rotating portion 161.

In the measure mode that utilizes the strip 131, the controller 191 may sense the amount of rotation of the drum 1621 through the second sensing portion 182 and converts the extent by which the strip 131 is withdrawn into length measurement. Further, in the measure mode that utilizes the driving wheels 161a', 161b', the controller 191 may sense the amount of rotation of the driving wheels 161a', 161b' through the first sensing portion 181, and converts the amount of rotation of the first rotating portion 161 into length measurement. In the measure mode that utilizes the contactless measuring portion 140, the controller 191 may convert the time during which the laser, infrared rays or ultrasonic waves generated from the contactless measuring portion 140 and received back may be converted into length measurement.

As described above, the electrical elements of the length measuring device 100 according to the sixth exemplary embodiment have the same functions as the elements with the same reference numerals described above with reference to FIG. 3. Accordingly, a detailed redundant explanation will be omitted for the sake of brevity.

Meanwhile, as exemplified in FIG. 5, the length measuring device according to the sixth exemplary embodiment also has a strip 131 coiled and stacked onto the drum 1621 by a plurality of times. Accordingly, considering that the length of the strip 131 being released will decrease gradually per rotation of the drum 1621, the conversion ratio for converting the unit amount of rotation into lengths may be decreased in a stepwise pattern by applying the algorithm as Mathematical Equation 1.

Figure 21:
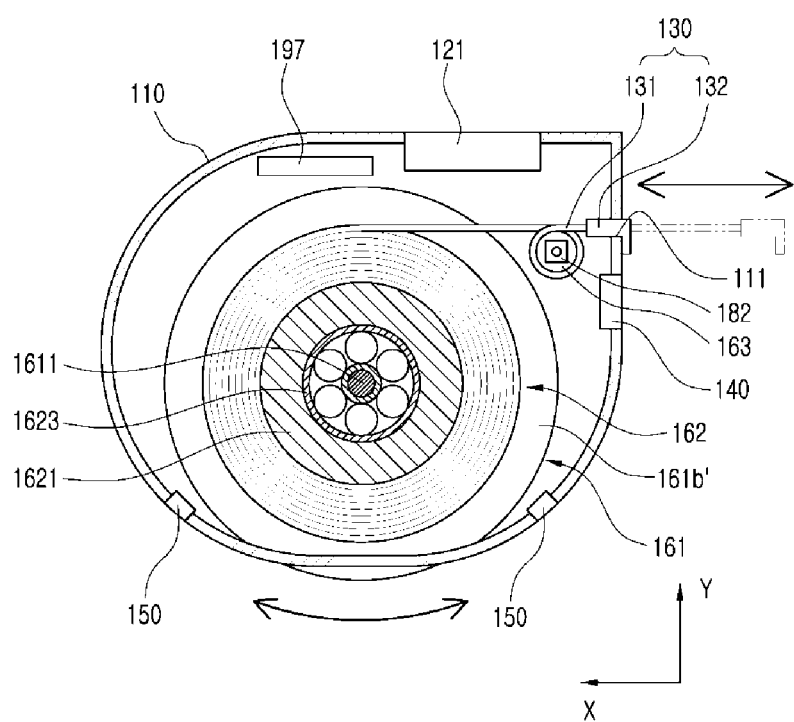
FIG. 21 illustrates relationships with which main elements of a length measuring device are disposed inside a casing, according to a seventh exemplary embodiment of the present disclosure.

Meanwhile, as exemplified in FIG. 21, the length measuring device 100 according to the sixth exemplary embodiment may additionally include a third rotating portion 163, in which case the amount of rotation of the third rotating portion 163, instead of that of the second rotating portion 162, may be converted into the length measurement.

FIG. 21 illustrates relationships with which main elements of a length measuring device are disposed inside a casing, according to a seventh exemplary embodiment of the present disclosure.

Referring to FIG. 21, the length measuring device 100 according to the seventh exemplary embodiment may additionally include the third rotating portion 163 which is disposed between the drum 1621 and the outlet 111, and in which the strip 131 is coiled from the drum 1621 toward the direction of the outlet 111 such that when the operator pulls the hook 132 fastened to the other end of the strip 131, the third rotating portion 163 is rotated simultaneously upon rotation of the drum 1621 of the second rotating portion 162.

More specifically, the third rotating portion 163 may be disposed between the drum 1621 and the outlet 111, and is configured to be coiled with the strip 131 of the drum 1621 of the second rotating portion 162 by a plurality of times, and then coiled with the strip 131 extending toward the direction of the outlet 11 by one time.

That is, because the strip 131 is coiled onto the drum 1621 of the second rotating portion 162 in a stacked structure as illustrated in FIG. 9, the length of the strip 131 being withdrawn out of the casing 110 will be gradually decreased as the number of rotation of the drum 1621 increases, whereas, because the strip 131 is coiled around the third rotating portion 163 only one time, the length of the strip 131 being withdrawn out of the casing 110 through the third rotating portion 163 can be maintained constant even when the number of rotation of the third rotating portion 163 increases.

Accordingly, when the strip 131 is withdrawn out of the casing 110, the controller 191 may sense the amount of rotation of the third rotating portion 163, rather than that of the drum 1621 of the second rotating portion 162, and convert this to calculate the length measurement. As a result, it is possible to accurately measure the lengths according to withdrawal and retraction of the strip 131 without requiring the complicated calculation as Mathematical Equation 1.

In one embodiment, the second sensing portion 182 may not be formed on the drum 1621, but formed on a rotational axis of the third rotating portion to measure the amount of rotation of the third rotating portion 163.

As illustrated in FIG. 4, the length measuring device 100 according to the fourth to seventh exemplary embodiments may have guide lines 210, 220 before and behind the length measuring device 100 through the laser guide portion 150 to enable the operator to take accurate length measurement while moving the length measuring device 100 along the guide lines 210, 220. Further, as illustrated in FIGS. 9 and 10, the length measuring device 100 according to the fourth to seventh exemplary embodiments is capable of taking straight or curved length measurement, and also taking a distance measurement to a remotely-located object to be measured with the contactless measuring portion 140. Of course, as illustrated in FIG. 11, the length measuring device 100 according to the fourth to seventh exemplary embodiments may be interoperated with the user terminal 200.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:
1. A length measuring device, comprising:
 a casing;
 a first rotating portion accommodated in the casing, the first rotating portion being rotated with a portion of a circumference thereof being exposed out of the casing and in contact with an object to be measured, the first rotating portion comprising:
  a rotational axis passed through the casing; and
  a driving wheel coupled with the rotational axis and disposed within the casing, to be rotated while being in contact with a surface of the object to be measured along the surface of the object to be measured;
 a first sensing portion configured to sense an amount of rotation of the first rotating portion;
 a controller configured to convert the amount of rotation of the first rotating portion into length measurement;
 a second rotating portion being coiled with a strip by a plurality of times, and being rotated according to the strip being withdrawn or retracted through an outlet formed in the casing; and a second sensing portion configured to sense an amount of rotation of the second rotating portion, wherein the controller converts the amount of rotation of the first rotating portion into length measurement, or converts the amount of rotation of the second rotating portion into length measurement.

2. The length measuring device of claim 1, wherein the controller converts the amount of rotation of the second rotating portion into length measurement, by applying a conversion ratio for converting a unit amount of rotation of the second rotating portion into a length, which is decreased in a stepwise pattern at predetermined intervals.

3. The length measuring device of claim 1, further comprising:
a second rotating portion coiled with the strip along a rotational axis sequentially by a plurality of times without overlapping, the second rotating portion being rotated according to the strip being withdrawn or retracted; and
a second sensing portion configured to sense an amount of rotation of the second rotating portion, wherein the controller converts the amount of rotation of the first rotating portion into length measurement, or converts the amount of rotation of the second rotating portion into length measurement.

4. The length measuring device of claim 1, further comprising a communication portion configured to transmit the length measurement externally.

5. A length measuring device, comprising:
a casing;
a first rotating portion accommodated in the casing, the first rotating portion being rotated with a portion of a circumference thereof being exposed out of the casing and in contact with an object to be measured;
a first sensing portion configured to sense an amount of rotation of the first rotating portion;
a controller configured to convert the amount of rotation of the first rotating portion into length measurement;
a second rotating portion onto which an end of the strip is attached and coiled by a plurality of times, the second rotating portion configured to automatically coil back the strip until other end of the strip is locked in an outlet formed in the casing;
a third rotating portion configured to be rotated in accordance with the strip being withdrawn or retracted through the outlet formed in the casing; and
a second sensing portion configured to sense an amount of rotation of the third rotating portion, wherein the controller converts the amount of rotation of the first rotating portion into length measurement, or convert the amount of rotation of the third rotating portion into length measurement.

6. The length measuring device of claim 5, wherein the third rotating portion is coiled with the strip one time, and the third rotating portion is rotated upon the strip being released from the second rotating portion.

7. A length measuring device, comprising:
a casing;
a first rotating portion accommodated in the casing, the first rotating portion being rotated with a portion of a circumference thereof being exposed out of the casing and in contact with an object to be measured, the first rotating portion comprising:
a rotational axis passed through the casing; and
a driving wheel coupled with the rotational axis and disposed within the casing, to be rotated while being in contact with a surface of the object to be measured along the surface of the object to be measured;
a first sensing portion configured to sense an amount of rotation of the first rotating portion;
a controller configured to convert the amount of rotation of the first rotating portion into length measurement; and
a second rotating portion being coupled with the first rotating portion and being individually rotatable, wherein a strip coiled around the second rotating portion is withdrawn out of the casing as much as a length of the object to be measured, wherein
the rotational axis comprises a first coupling portion formed in a polygonal column shape to be coupled with the driving wheel, and a second coupling portion in a cylindrical column shape extended from an end of the first coupling portion along a direction of axis to be coupled with the second rotating portion.

8. The length measuring device of claim 7, wherein the second rotating portion comprises a drum coupled with the second coupling portion and individually driven from the rotational axis, wherein
the strip is coiled around the drum, and withdrawn out of the casing during measurement, while rotating the drum.

9. The length measuring device of claim 8, wherein the second rotating portion further comprises a drum support bearing disposed between the drum and the second coupling portion to support the drum.

10. The length measuring device of claim 8, further comprising a second sensing portion configured to sense an amount of rotation of the drum, wherein the first sensing portion senses the amount of rotation of the driving wheel, and the controller converts the amount of rotation of the driving wheel or the amount of rotation of the drum into length measurement.

11. The length measuring device of claim 8, further comprising:
a third rotating portion coiled one time with the strip before the strip is withdrawn out of the casing, wherein the strip is coiled onto the drum by a plurality of times; and
a second sensing portion configured to sense an amount of rotation of the third rotating portion,
wherein the first sensing portion senses the amount of rotation of the driving wheel, and
the controller converts the amount of rotation of the driving wheel or the amount of rotation of the third rotating portion into length measurement.

12. A length measuring device, comprising:
a casing comprising an outlet through which a strip is withdrawn or retracted;
a switch provided on the casing;
a first rotating portion accommodated in the casing, the first rotating portion being rotated with a portion of a circumference thereof being exposed out of the casing and in contact with an object to be measured, the first rotating portion having a first rotating gear formed at a center;
a second rotating portion coiled with the strip by a plurality of times, the second rotating portion being rotated according to withdrawal or retraction of the strip and having a second rotating gear at a center;
a third rotating gear connected to the switch such that the third rotating gear is in mesh with the first rotating gear or the second rotating gear according to switching operation of the switch;

a sensing portion configured to sense an amount of rotation of the third rotating gear; and a controller configured to convert the amount of rotation of the third rotating gear into length measurement.

13. The length measuring device of claim 12, wherein the sensing portion is formed at a rotational axis of the third rotating gear.

14. The length measuring device of claim 12, wherein the third rotating gear is rotated in mesh with the first rotating gear to cause the sensing portion to sense the amount of rotation of the first rotating portion, when the switch is in a first position and rotated in mesh with the second rotating gear to cause the sensing portion to sense the amount of rotation of the second rotating portion, when the switch is in a second position.

15. The length measuring device of claim 12, further comprising a fourth rotating gear meshed with the first rotating gear, wherein, when the third rotating gear is meshed with the second rotating gear, the fourth rotating gear is meshed with the third rotating gear together.

\* \* \* \* \*